United States Patent [19]

Gawrilow

[11] 4,234,606

[45] Nov. 18, 1980

[54] FLUID SHORTENING

[75] Inventor: Ilija Gawrilow, Strongsville, Ohio

[73] Assignee: SCM Corporation, New York, N.Y.

[21] Appl. No.: 930,746

[22] Filed: Aug. 3, 1978

Related U.S. Application Data

[63] Continuation-in-part of Ser. No. 747,296, Dec. 3, 1976.

[51] Int. Cl.$^3$ .......................... A21D 2/16; A23D 5/02
[52] U.S. Cl. ........................................ 426/24; 426/62; 426/606; 426/653
[58] Field of Search .................. 426/24, 62, 601, 604, 426/606, 612, 607, 653, 654; 252/356

[56] References Cited

U.S. PATENT DOCUMENTS

| | | | |
|---|---|---|---|
| 3,433,645 | 3/1969 | Egan et al. | 426/24 |
| 3,752,675 | 8/1973 | Tsen et al. | 426/24 |
| 3,752,770 | 8/1973 | Buddgemeyer | 426/653 X |
| 3,914,452 | 10/1975 | Norris | 426/601 X |
| 3,943,259 | 3/1976 | Norris | 426/24 |

Primary Examiner—Robert A. Yoncoskie
Attorney, Agent, or Firm—Richard H. Thomas

[57] ABSTRACT

An improved stabilized fluid shortening containing conditioning agents and softening agents for use in baking comprises about 4 to 10 weight parts of soft or hard mono- and diglyceride, about 2 to 8 weight parts of ethoxylated mono- and diglyceride, about 2 to 8 weight parts of a solid phase ester emulsifier selected from the group consisting of a succinylated mono- and diglyceride and an alkali or alkaline earth metal salt of an acyl lactylate, and about 40 to about 70 weight parts of liquid vegetable oil, wherein the fluid shortening is in a stabilized dispersion. The fluid shortening can be produced as a concentrate and can be hydrated with water to produce a hydrated fluid shortening.

The shortening may also contain about 0 to about 3 weight parts of solid stearine.

11 Claims, No Drawings

FLUID SHORTENING

The present invention is a continuation-in-part of prior application Ser. No. 747,296, filed Dec. 3, 1976, assigned to assignee of the present application, and captioned "Stable Fluent Emulsifier Concentrate Containing Solid Phase Emulsifier Components".

BACKGROUND OF THE INVENTION

Fluid shortening is useful in the preparation of baked goods and bread-making processes. The function of fluid shortenings is similar to plastic shortenings in baking processes, but fluid shortenings are much preferred for use in commercial baking processes due to ease in handling, pumping, and metering. Fluid shortenings characteristically are fluid at temperatures of about 60° F. to 100° F. and should not become unstable in storage over this temperature range, or in use, by separation into two distinct liquid phases or liquid-solid phases; i.e., producing a supernatent liquid phase and a precipitate phase. Fluid shortenings should possess a stabilized fluid consistency wherein the viscosity remains relatively consistent over a wide temperature range.

Fluid shortenings or fat compositions are known in the art containing hard mono- and diglyceride emulsifiers having an iodine value of less than 15 and usually about 0 to 5. Problems have occurred in conventional prior art fluid shortenings, however, wherein the fluid shortenings have a tendency to firm or solidify upon encountering temperatures below about 50° F. Other suggested conventional fluid shortenings containing stable suspensions of about 5 to 7 percent finely divided saturated solid fatty acid hard glycerides lack sufficient solid fat for use in a continuous-mix bread-making process in addition to lacking a stability in excess of about 30 days. Still other prior art fluid shortenings are based on solid hydrogenated hard fats to overcome oxidation instability but unfortunately are of high viscosity and become unmanageable with varying winter and summer temperatures.

It should be understood the term "fluid" for purposes of the present application is not necessarily synonomous with liquid. A fluid shortening normally is considered to have both liquid and solid phases, the latter being in the form of solid particles of fat and emulsifier in suspension. The term liquid implies no solid phase.

Prior U.S. Pat. No. 3,914,452, to Max E. Norris, assigned to assignee of the present application, discloses an improved fluid shortening which contains about 4 to 14 weight parts of a soft mono- and diglyceride, having an iodine value of more than about 40, in combination with about 2 to 8 weight parts of an ester emulsifier, 0 to 8 weight parts of a solid stearine, and at least about 40 weight parts of liquid vegetable oil. The fluid shortening is a stabilized dispersion in vegetable oil, and is produced by melting a blend of the components at temperatures sufficient to force a melt, subjecting the melt to rapid chilling in a scraped-wall chiller such as a Votator "A" unit, and then agitation in Votator "B" unit, followed by prolonged agitation or fluidization in a tank referred to as a stehling tank, the chilling, votation and stehling being carried out to and at a temperature in the range of about 80° F. to 90° F. The purpose of the chilling, votation and stehling is to develop a beta-crystal polymorphic form of the solidified ingredients necessary to obtain a suspension which is both fluid and stable. The fluid shortening of this patent had the advantage, among others, that it possessed a stabilized fluid consistency the viscosity of which remained relatively constant over a wide temperature range.

In copending application Ser. No. 747,296, there is claimed the improvement of a unique emulsifier blend which is capable of being mixed with a vegetable oil to produce a fluid shortening. The uniqueness of the blend is such that it can be admixed with the vegetable oil by simple mechanical mixing without the necessity of the stehling steps of prior U.S. Pat. No. 3,914,452, and still produce a stable product. The advatage of the invention of Ser. No. 747,296 is that, in certain instances, it may be desirable to save on shipping costs by shipping only the emulsifier components and other shortening ingredients absent the vegetable oil to a point of further processing. Such point of further processing may not possess the stehling equipment and capability necessary to permit the manufacture of the shortening in accordance with the procedure of the '452 patent. The essential aspect of the invention of the copending application resided in a concentrate blend consisting essentially of a liquid partial glycerol ester food emulsifier vehicle having dispersed therein an ethoxylated fatty acid ester and a solid beta-phase fine crystalline food emulsifier component, the proportions of ingredients being such as to produce a fluent cloudy suspension. Preferred solid beta-phase crystalline food emulsifers were an alkali or alkaline earth metal salt of an acyl lactylate; and a succinylated mono- and diglyceride. It was found that the unique combination of emulsifier ingredients rendered the blend not only readily mixable with a vegetable oil, but also stable in the vegetable oil to produce a shortening capable of being stored for long periods of time.

Another advantage of the concentrate of the copending application was that it gave a shortening product having distinctly improved functionalities over conventional fluid shortenings.

The present invention constitutes a still further advance in the manufacture of shortenings, employing the technology in part of prior application Ser. No. 747,296.

SUMMARY OF THE INVENTION

The fluid shortening of the present invention comprises at least about 40 weight parts of a liquid vegetable oil into which is dispersed about 4 to about 10 weight parts of a soft or hard mono- and diglyceride, about 2 to about 8 weight parts of an ethoxylated mono- and diglyceride, and about 2 to about 8 weight parts of a solid beta-phase fine crystalline food emulsifier component, preferably selected from the group consisting of an alkali or alkaline earth metal salt of an acyl lactylate, and a succinylated mono- and diglyceride; wherein the stabilized fluid shortening is produced by melting a blend of the foregoing components at a temperature sufficient to force a melt, votating the blend at temperatures of about 80° F. to about 90° F., preferably about 82° F. to about 87° F., and fluidizing or stehling the votated mixture, at about such temperature, to obtain substantially 100% conversion to the stable beta-polymorphic form.

The shortening of the present invention may also contain about 0 to about 3 weight parts of solid stearine.

The fluid shortening of the present invention preferably contains a ratio of mono- and diglycerides to ethoxylated mono- and diglycerides in the range of about 55/45 to about 40/60, by weight.

DETAILED DESCRIPTION OF THE PRESENT INVENTION

The stabilized fluid shortening of the present invention is produced from a suitable blend of small amounts of soft or hard mono- and diglycerides, ester emulsifiers, and solid beta-phase fine crystalline food emulsifiers all dispersed in large amounts of liquid vegetable oil to maintain a substantially uniform dispersion.

The soft or hard mono- and diglycerides are essential and generally are a mixture of unsaturated and saturated glycidal esters of fatty acids typically derived from hydrogenated and non-hydrogenated vegetable oils such as soybean oil, corn oil, olive oil, peanut oil, safflower oil, cottonseed oil, palm oil, and like vegetable oils, and animal fats such as tallow and lard. The ratio of monoglycerides to diglycerides in conventional soft mono- and diglycerides typically is about 40 to 60 weight percent monoglyceride to about 35 to 45 weight percent diglycerides and minor amounts of 5 to 14 percent triglycerides, and such soft mono-, di- and triglyceride mixtures are commercially available. The soft or hard mono- and diglycerides have an iodine value in the broad range of about 0 to 150 and may be prepared from hydrogenated and non-hydrogenated vegetable oils or animal fats. Soft mono- and diglycerides derived from vegetable oils preferably have an iodine number between about 65 to 150, whereas the animal fats preferably have an iodine number of about 40 to 65. The preferred iodine number range of the soft mono- and di- glycerides is between about 40 to 85. Soft mono- and diglycerides may be plastic in consistency and typically may have a capillary melting point as high as 130° F. The acid number of soft mono- and diglycerides is less than 2 and the peroxide value thereof should be less than 1, in accordance with conventional specifications of mono- and diglycerides commercially available.

Specific mono- and diglycerides within the scope of the present invention include soft and hard glycerol monooleates (GMO). One glycerol monooleate useful in the present invention is "Dur-em 114", trademark SCM Corporation, comprising mono- and diglycerides of hydrogenated vegetable oil having an iodine value of 70–80, at least 40% α-monoglyceride, and a capillary melting point of 110°–120° F. This mono- and diglyceride is sold in the form of a cream plastic. Another suitable glycerol monooleate useful in the present invention is "Dur-em 204", trademark SCM Corporation, comprising mono- and diglycerides of hydrogenated vegetable oil having an iodine value of 65–75, at least 52% αmonoglyceride, and a capillary melting point of 120°–130° F. This mono- and diglyceride is marketed in the form of a cream plastic.

The fluid shortening of this invention further includes between about 2 to 8 parts of an ethoxylated fatty acid ester emulsifier for use as dough conditioners. The class of ethoxylated fatty acid esters useful in the present invention are the ethoxylated fatty acid esters of glycerol, hexitol, hexitan and isohexide, as well as the fatty acid esters of ethoxylated glycerol, hexitol, hexitan and isohexide. A preferred class of compounds for use in the present invention are the ethoxylated mono- and diglycerides, which are the polyethoxylated fatty acid esters of glycerol, and may be conventionally described as a mixture of stearate, palmitate, and lesser amounts of myristate partial esters of glycerin condensed with about 18 to 22 moles, preferably about 20 moles, of ethylene oxide per mole of α-monoglyceride reaction mixture such as set forth in The Food Codex and FDA Regulations, and more particularly as set forth in the Egan patent, U.S. Pat. No. 3,433,645, incorporated herein by reference. The fatty acid radicals of ethoxylated monoglycerides preferably are higher fatty acid chains having about 12 to 18 carbon atoms.

Representative fatty acid mono- and diesters of glycerin from which the ethoxylated monoglycerides are derived are glycerol monostearate, glycerol distearate, glycerol monopalmitate, glycerol dipalmitate, glycerol monooleate, glycerol dioleate, and others.

One suitable ethoxylated mono- and diglyceride that may be employed in the present invention is "Durfax E.O.M.", trademark SCM Corporation, an ethoxylated mono- and diglyceride derived from meat fat having a saponification value of 65–75 and an hydroxyl value of 65–80. Other specifications for this emulsifier are an acid value maximum of 2.0, an IV number based on fatty acid content of 3 maximum and an oxyethylene content of 60.5–65.0%.

Preferably, the ethoxylated monoglycerides for this invention have an hydroxyl value of about 65 to 80, a saponification number of about 65 to 75, acid values less than about 2, and an oxyethylene content of about 60 to 65 weight percent based on the total ethoxylated glyceride composition. The capillary melting point of ethoxylated mono- and diglycerides is between about 75° to 95° F. and preferably between about 80° to 90° F. Ethoxylated monoglycerides may be prepared by reacting ethylene oxide with a mono- and diglyceride mixture at temperatures of about 125° to 175° C., such as suggested in the Egan patent, U.S. Pat. No. 3,490,918, and incorporated by reference herein.

Representative of other polyoxyethylene-containing fatty acid esters useful in the present invention are the polysorbates (polysorbate 60) such as polyoxyethylene sorbitol distearate, polyoxyethylene sorbitan monostearate, polyoxyethylene isosorbide monopalmitate, polyoxyethylene sorbitan distearate, polyoxyethylene isosorbide monooleate, polyoxyethylene sorbitol, trilaurate, polyoxyethylene sorbitan dibehenate, polyoxyethylene isosorbide monolinoleate, polyoxyethylene sorbitan monolaurate, ethoxylated propylene glycol monoesters, polyoxyethylene mannitan monooleate, polyoxyethylene sorbitan monopalmitate, polyoxyethylene sorbitol oleate, as well as other similar ethoxylated fatty acid esters of ethoxylated hexitols, hexitans, and isohexides.

The solid phase crystalline food emulsifer component can be any beta-forming emulsifying ingredient which remains in whole or in part suspended and in solid phase form in the shortening composition of the present invention, in the presence of the ethoxylated fatty acid ester, in the proportions as defined herein. For purposes of the present application, the term "beta-forming" describes the predominant crystal form adopted by the solid phase component on rapid chilling of the concentrated system from a melt form at an elevated temperature, followed by agitation for a prolonged period of time to develop and maintain a homogeneous dispersion of the desired beta-crystals in the fluid concentrate, in accordance with techniques known in the art.

Examples of functional solid phase fine crystalline food emulsifier components, which are beta-forming, are an alkali or alkaline earth metal salt of an acyl lactylate, or alternatively a succinylated mono- and diglyceride. The fatty acid lactylates and process for their manufacture are described in detail in U.S. Pat. No.

2,733,252, assigned to C. J. Patterson Company. The subject matter of this patent is incorporated by reference herein. Preferably, these compounds are the acyl lactylates of $C_{14}$–$C_{22}$ fatty acids. The two most common such compounds are sodium and calcium stearoyl-2-lactylate, known as "Emplex" and "Verv" (trademarks) marketed by C. J. Patterson Company. Both are described in the Food Chemicals Codex, Second Edition, 1972 (National Academy of Sciences, Washington, D.C.) on pages 160 and 770, and can be prepared by admixing lactic acid in an aqueous medium with commercial stearic acid (an admixture of myristic, palmitic and stearic fatty acids) at a sufficiently elevated temperature to cause a condensation reaction to occur. Other examples of the sodium stearoyl-2-lactylate are "Artodan SP 50" marketed by Grinsted Corp. and "Stearolac S450" marketed by The Paniplus Company. Specific procedures for producing the lactylates, of which the number 2 indicates the average number of lactyl groups on the molecule, are set forth in U.S. Pat. No. 2,789,992, insofar as the sodium stearoyl-2-lactylate ester is concerned, and the aforementioned U.S. Pat. No. 2,733,252, which describes both the preparation of sodium stearoyl-2-lactylate from stearic acid, sodium hydroxide, carbonate or bicarbonate and lactylic acid, and also sets forth the parameters for the production of the calcium lactylate composition. The disclosures of the "Food Chemicals Codex" publication and the U.S. Pat. No. 2,789,992 are also incorporated by reference herein.

Particular reference can be had to the Food and Drug Administration Regulation Title 21, Section 121.1211, on sodium stearoyl-2-lactylate. This compond is said to be a mixture of sodium salts of stearoyl lactylic acid and minor proportions of other sodium salts of related acids, manufactured by the reaction of stearic acid and lactic acid and conversion to the sodium salts. This emulsifier meets the following specifications:

| Acid Number: | 60–80 |
| Sodium Content: | 3.5%–5% |
| Lactic Acid Content: | 31%–34% |
| Ester Number: | 150–190 |

The manufacture of succinylated mono- and diglycerides is disclosed in U.S. Pat. No. 3,370,958, assigned to National Dairy Products Corporation, incorporated by reference herein. These compounds are also described in Food and Drug Administration Regulation, Section 121.1197. It is stated that they are a mixture of half succinic acid esters of mono- and diglycerides produced by the succinylation of a product obtained by the glycerolysis of edible fats and oils or by the direct esterification of glycerol with edible fat-forming fatty acids. They have a succinic acid content of 14.8 to 25.6%, a melting point of 50° C. to 60° C. and an acid number of 70–120. Other such beta-forming emulsifiers are succinylated propylene glycol stearate and succinylated sorbitan esters.

The foregoing described soft or hard mono- and diglycerides hereinbefore described and the ethoxylated mono- and diglycerides are preferably contained in the fluid shortening in a wide range of a weight ratio of about 80 to 20 weight parts of soft or hard mono- and diglycerides to 20 to 80 weight parts of ethoxylated mono- and diglycerides. Preferably, the weight ratio may range from about 55/45 to 40/60; and the most preferred ratio is about 60 weight parts of soft or hard mono- and diglycerides to about 49 weight parts of ethoxylated monoglyceride.

The fluid shortening of this invention further can include minor amounts of solid stearine within the dispersed blend. Stearines useful in this invention are derived from beta-tending fats such as, for example, soybean oil, peanut oil, safflower oil, and hydrogenated lard. Beta-tending solid stearines may be identified by X-ray diffraction wherein polymorphic forms are identified using a Phillips X-ray Diffractometer goniometer coupled with a strip chart recorder. The goniometer has a scanning range of 17.0° to 25.0° wherein beta-polymorphic form displays identifying peaks at 19.4°, 23.0°, and 24.0°, respectively. The iodine value of solid stearines may range from 0 to 15 and preferably 0 to 5. The capillary melting point of the solid stearines advantageously ranges from 130° to 155° F., and preferably 140° to 145° F. The preferred solid stearine is soybean stearine having an iodine number of about 0 to 5 and derived from hydrogenated soybean oil.

The foregoing components are dispersed within major amounts of liquid vegetable oils, commonly referred to as lipids, and primarily consisting of triglycerides wherein at least about 90 weight percent and preferably above 95 weight percent of the vegetable oil and glycidal esters. Suitable liquid vegetable oils include, for example, soybean oil, peanut oil, mustardseed oil, safflower seed oil, corn oil, and like vegetable oils. Suitable liquid vegetable oils for this invention have an iodine value between about 90 to 150 and preferably 120 to 130. The liquid vegetable oils are liquid at room temperature and preferably have a melting point of less than 50° F. Preferred liquid vegetable oils include soybean oil, and high oleic safflower seed oil.

In practice, the fluid shortening of this invention is produced by mixing on a weight basis about 4 to 10 weight parts of soft or hard mono- and diglycerides; 2 to 8 weight parts of ethoxylated mono- and diglycerides; 2 to 8 weight parts solid beta-phase fine crystalline food emulsifier, e.g., sodium stearoyl-2-lactylate; and the balance being at least about 40 weight parts of liquid vegetable oil. The fluid shortening components are heated to a temperature sufficient to liquefy all of the components which usually requires temperatures of about 130° to 150° F. whereby a substantially uniform liquid blend results. The liquid blend is then passed through a swept-surface heat exchanger for quickly chilling the liquid blend to initiate beta-crystal formation within the chilled liquid blend. The temperature of the blend in the swept-surface heat exchanger is quickly reduced to at least 87° F., preferably about 82° to 87° F., and maintained at this temperature until the chilled blend exits from the swept-surface heat exchanger. A suitable swept-surface heat exchanger for the purpose of this invention is a commercially available "Votator" A type unit chilling machine as described in detail in U.S. Pat. No. 3,011,896. The Votator A unit causes fat crystals to form and become dispersed within the liquid vegetable oil and further initiates beta-crystal formation. The chilled blend containing fat crystals and having a temperature of about 82° to 87° F. is then passed to a holding tank for working by mildly agitating the chilled blend to a product of desirable consistency. The holding tank may be similar in construction to the swept-surface heat exchanger and sometimes is referred to as a "Votator B Unit" which merely agitates the chilled blend to allow beta-crystallization to develop. The Votator B unit further maintains the chilled blend temperature at about 85° to 89° F. whereby fat crystals continue to form within the chilled blend. The Votator B unit mildly agitates the chilled blend being passed therethrough on a continuous basis for about one minute to work the chilled blend into a substantially uniform dispersion wherein the fat crystals dispersed in the vegetable oil are in equilibrium with the liquid vegetable oil. The Votator B unit further provides for removing any localized heat released during the continued formation of fat crystals and the temperature of the chilled blend is maintained between 85° and 89° F. Formation of beta-crystals within the chilled blend depends on effectively maintained the temperature of the chilled blend between 85° and 89° F. while passing through the Votator B unit. If temperatures of the blend fall below 85° F., unacceptable viscosities result, whereas blend temperatures above 89° F. tend to produce liquid shortenings with considerably reduced stability. Maintenance of blend temperatures between 85° and 89° F. is particularly necessary in this invention due to the varied and multiple melting points of the various components of the fluid shortening. In this regard, the soft or hard mono- and diglycerides have melting points up to about 130° F.; the hard stock solid stearine has a melting point between about 130° and 155° F.; the ethoxylated monoglycerides have a melting point between about 75° and 95° F.; the sodium stearoyl-2-lactylate melts between about 135°–145° F.; and the liquid vegetable oil usually has a melting point below 50° F. Hence, it has been found that the temperature of the chilled blend of components must be maintained between 85° and 89° F., preferably 85° to 87° F., while passing through the Votator B unit. The components, although having a wide variation in melting points, appear to be effectively stabilized and uniformly dispersed within the liquid vegetable oil to provide remarkable stable uniform dispersion.

Although not intended to be bound by theory, it is believed that the liquid vegetable oil serves as a continuous-phase matrix for the other components wherein the beta-phase fine crystalline food emulsifier, e.g. sodium stearoyl-2-lactylate, initially crystallizes within the liquid vegetable oil matrix upon rapid cooling to less than about 87° F. in the swept-surface heat exchanger. Upon further cooling, the soft or hard mono- and diglycerides are believed to associate with the crystallized sodium stearoyl-2-lactylate so as to hold the lactylate suspended within the vegetable oil, the soft mono- and diglycerides having limited affinity for both the oil and the sodium stearoyl-2-lactylate. Further cooling in the critical range of about 80° to 90° F., preferably about 82° to 87° F., is believed to cause the lower melting point ethoxylated monoglycerides as well as additional sodium stearoyl-2-lactylate and soft mono- and diglycerides to become suspended within the matrix of oil providing a stabilized dispersion wherein said components are stably dispersed within the liquid vegetable oil matrix. Nevertheless, substantial deviations from maintaining the temperature of the blend between 82° and 87° F. in the holding tank result in the fluid shortening having abnormally high and undesirable viscosities as well as loss of physical stability.

After processing is completed in the Votator B unit, sometimes referred to as Votation, the resulting stabilized uniform dispersion mixture is then passed to a stehling tank for continuous agitation or fluidization at temperatures between about 82° to 90° F., advantageously 85° to 87° F. Fluidization continues for time sufficient to complete conversion of the fat crystals to the betacrystal, that is, at least 90 percent conversion and preferably 95 to 100 percent conversion to the beta-crystal form. Fluidization continues for extended periods and up to about 24 hours for diluted dispersion mixtures to form a completely stabilized suspension of predominantly beta-crystals suspended within the liquid vegetable oil matrix to produce the stabilized fluid shortening of this invention. The resulting fluid shortening of this invention has superior stability upon repeated temperature cycling between about 50° and 100° F. and maintains the stable dispersion for at least about 3 months.

A further advantageous aspect of this invention is that fluid shortening containing not greater than about 5 percent by volume entrapped air or other gas advantageously prolonged the stability of the fluid shortening even longer. Physical stability was maintained, but even more surprisingly, viscosity characteristics as a function of time and temperature were substantially improved in low gas systems. In a temperature range of 50° to 100° F., for example, fluid shortening having a viscosity of about 730 cps and having less than 5 percent entrapped air possessed improved viscosity control over a 6-week period wherein viscosity increases were about one-half than when compared to commercial fluid shortening containing greater than 5 percent entrapped air by volume. Accordingly, the preferred fluid shortening of this invention contains not greater than about 5 percent air by volume.

The following examples further illustrate the invention but are not to be construed as limiting the scope of the present invention.

EXAMPLE 1

A fluid shortening was produced having the following components:

TABLE 1

| Ingredient | Percentage (Weight) |
|---|---|
| Refined soybean oil | 84.2 |
| Mono- and diglycerides (70–80 IV) (Dur-em 114) | 6.0 |
| Ethoxylated mono- and diglyceride (Durfax E.O.M.) | 4.9 |
| Sodium stearoyl-2-lactylate (Emplex) | 4.9 |

The ingredients were charged into a holding tank and heated to a temperature of about 140° to 145° F. and agitated at this temperature until a molten mixture was obtained. The molten mixture was then pumped at a temperature of about 140° F. to a first Votator Unit "A" wherein the mixture was rapidly cooled to a chilled blend at a temperature of approximately 83° F. The mixture was then pumped, at this temperature, into a Votator "B" Unit where it was maintained, at about 86° F., with mild agitation, to produce a stabilized uniform dispersion. Holding time of the chilled blend within the Votator "B" Unit was about one minute.

The fluid shortening mixture was then continually agitated at about 85° to 87° F. in a stehling tank, at about 16 r.p.m., for a period of about 18-24 hours, resulting in a stabilized substantially uniform dispersion having the following characteristics:

a. Stability

After 18 hours of fluidization, there was 0 percent dissociation.

After 24 hours of stehling, there was 0 percent dissociation measured by a centrifuge test using a 50 ml. graduated test tube and centrifuging at 2,000 r.p.m. for 15 minutes.

b. Viscosity

After 18 hours of fluidization, viscosity of the fluid shortening was 575 cps as measured by Brookfield Model LVT using a No. 3 spindle at 60 r.p.m.

After 24 hours of fluidization, viscosity of the fluid shortening was similarly measured to 520 cps.

c. Solids Fat Profile: Measurement was by American Oil Chemical Society Test No. CD-10-57

50° F. yielded 7-9 SFI units
70° F. yielded 7-9 SFI units
92° F. yielded 6-7 SFI units
104° F. yielded 5-6 SFI units.

d. Long Term Stability

After 70 days, less than 2 percent separation by volume resulted from centrifuging 15 minutes at 2,000 r.p.m.

e. Beta-Polymorphic Form

Conversion to the beta-crystal form was 100 percent as measured by Test No. 0.0036*.

*Durkee Internal Test No. 0.0036 is a test wherein the polymorphic forms are characterized using a Phillips X-ray Diffractometer coupled with a strip chart recorder. The copper target tube was operated at 30 KV potential and 15 MA current. The radiation, K, was filtered with a nickel filter. The scanning range of the goniometer was 17.00° to 25.0° at a rate of 0.5° per minute (2 θ the angle of diffraction used for short spacings). Test samples are prepared by filtering a sample of fluid shortening placed in a No. 5 filter paper loaded in a Buchner Funnel operating for 5 minutes at full water aspirator pressure. The solid cake remaining on the filter paper was packed into diffraction holders and tested. Polymorphic forms are identified by noting the positions of the peaks on the X-ray pattern which is a plot of intensity of diffracted rays vs. angle of diffraction recorded. Polymorphic forms are identified in accordance with the following scheme: α form displays one peak at 21.5°; β' form displays two peaks at 21.3° and 23.7°; β form displays three peaks at 19.4°, 23.0°, and 24.0°; β is the stablest polymorphic form for all animal or vegetable fats.

EXAMPLE 2

The fluid shortening of Example 1 was employed in a bread mix having the following composition:

TABLE 2

| | Ingredient | Baker's Percentage |
|---|---|---|
| Brew formula: | Granulated sugar | 2.00 |
| | Salt | 2.00 |
| | Yeast | 3.25 |
| | Yeast food | 0.75 |
| | Water | 65.00 |
| | KIO$_3$/KBrO$_3$ | 75 parts per million |
| | Sodium Propionate | 0.16 |
| Spike: | Granulated sugar | 5.00 |
| | High heat milk solids | 2.00 |

Preparation of bread loaves was as follows. Flour was metered into the above formulation by a conveyor system at 100 percent level and the shortening was metered into the same at about 3.0% level basis flour content. The resulting dough was maintained at a temperature of about 98° to 102° F. and extracted into 15.5 ounce bread samples and baked to produce standard bread loaves. The bread loaves had increased softness and increased shelf life, as evident from the following Table 3. Further favorable bread properties were realized including excellent volume, shock loss and bread score, as evident from the following Table 4, and also excellent crumb, crust, grain, texture, side walls, and flavor, excellent slicing properties, excellent bread packaging properties, and excellent storage properties. The following Table 3 gives comparative data comparing the hardness of the bread of the present invention, after one day, three days and seven days, with a similar loaf of bread made according to the above procedure, but using the teachings of prior U.S. Pat. No. 3,914,452, and also by comparison with a standard bread load made following the above procedure but having only a vegetable oil absent the emulsifier ingredients of the present invention.

TABLE 3

| | Instron Values Inch/Gram* | | |
|---|---|---|---|
| Shortening | 1 day | 3 days | 7 days |
| Example in Table 1 | 16.0 | 30.2 | 43.2 |
| B-12K (Process of 3,914,452) | 19.3 | 47.9 | 59.0 |
| Negative Control | 22.2 | 48.2 | 70.0 |

*This test is an Instron procedure test for measuring bread softness and conducted on a table model Instron Unit coupled with a strip chart recorder and an integrator. The CB Censor Cell of the Instron had a load range of 0–2000 grams, and the aluminum cylindrical probe was 3 centimeters by 2.5 centimeters. The test sample was produced by placing a test loaf into a bread slicing miter box with slots and slicing the test loaf into 2-inch sections. Softness measurements were conducted on two segments of each loaf which adjoins the center slice in the direction of the closest end. The integrator reading was reported by compressing the crumb to a depth of 0.5 inch at a crosshead rate of 0.5 inch per minute with the probe positioned approximately at the center of the slice and exactly on the testing surface. A value E was obtained as a relative measure of softness of the bread wherein higher values of E relect a firmer bread product. E is a unit of work of work or energy calculated from the following formula:
E = X/5000 L S,
wherein
E = the energy in inch-gram
L = the full-scale load in grams
S = the rate of compression
X = the integrated value.

Further functional comparative data is given in the following Table 4.

TABLE 4

| | Continous Mix Bread | | |
|---|---|---|---|
| Shortening | Volume, cc/gm | Shock Loss | Bread Scored |
| Invention | 7.08 | 6.9 | 93 |
| B-12K (Process of 3,914,452) | 6.73 | 13.4 | 89 |
| Negative Control | 6.4 | 31 | 80 |

From the above data, it is apparent that the concepts of the present invention provide improved functionality in bread, particularly with respect to softness and conditioning. Also improved are keeping quality, and physical and chemical stability. The shortening of the present invention also has the advantage that it possesses a low viscosity which lends itself for metering and pumping at ambient temperatures. The shortening is more convenient to use in that all of the components are delivered to the dough system from the fat tank. The shortening also possesses the desired beta-polymorphic form immediately after stehling and remains stable with time.

The method by which the fluid system of the present invention is processed permits the ethoxylated monoglycerides to remain in dispersion over a wide temperature range without loss of physical stability and build-up in viscosity despite inherent incompatibility with the mono- and diglycerides, liquid soybean oil and Emplex.

EXAMPLE 3

The fluid shortening of Example 1 was prepared, containing, in addition to the ingredients listed, 3% of a soybean stearine. The percentages for the other ingredients were adjusted accordingly. The shortening was subjected to votation and stehling, following the same procedure of Example 1, resulting in a stabilized substantially uniform dispersion having essentially the same characteristics as those obtained for the shortening of Example 1. The only difference was that the shortening of this example had a slightly higher viscosity at higher temperatures, and thus slightly increased stability at higher temperatures, rendering the shortening more suitable for use in summer months.

The shortening, employed in a bread mix, as in Example 2, gave bread loaves having essentially the same properties as those achieved in the procedure of Example 2.

What is claimed is:

1. In a process for making yeast-raised bakery produces containing shortening, the improvement comprising adding to such products a fluid shortening prepared by the process comprising:

heating a mixture of soft or hard mono- and diglycerides, ethoxylated fatty acid ester emulsifier, solid beta-phase crystalline food emulsifier, and liquid vegetable oil to form a liquefied molten mixture, said mixture comprising by weight about 4 to about 10 weight parts of said soft or hard mono- and diglyceride, about 2 to about 8 weight parts of said ethoxylated fatty acid ester emulsifier, about 2 to about 8 weight parts of said solid beta-phase crystalline food emulsifier, and about 0 to about 3 weight parts solid stearine, the remainder being at least about 40 parts of said liquid vegetable oil;

said ethoxylated fatty acid ester emulsifier being an ethoxylated fatty acid ester of glycerol, polyglycerols propylene glycol, hexitol, hexitan and isohexide, or a fatty acid ester of ethoxylated glycerol, hexitol, hexitan and isohexide;

rapidly cooling said molten mixture to a temperature within the range of about 80° to 90° F. to initiate beta-crystal formation and produce a chilled blend having dispersed fat crystals;

working said chilled blend within said temperature range to further develop beta-crystal formation and produce a substantially uniform dispersion containing beta-fat crystals in equilibrium with said liquid vegetable oil; and fluidizing said uniform dispersion still within said temperature range for a time sufficient to complete the beta-crystal formation and produce a stabilized fluid shortening.

2. The process of claim 1 wherein said solid beta-phase crystalline food emulsifier component is selected from the group consisting of an alkali or alkaline earth metal salt of an acyl lactylate, and a succinylated mono- and diglyceride.

3. The process of claim 2 wherein said soft or hard mono- and diglyceride has an iodine value in the range of about 0 to about 150.

4. The process of claim 3 wherein said ester emulsifier is selected from the group consisting of ethoxylated monoglyceride, ethoxylated sorbitan, ethoxylated mannitan, ethoxylated monooleate, ethoxylated propylene glycol monoesters, and ethoxylated triglycerol monostearate.

5. A stabilized fluid shortening having beta-fat crystals dispersed in liquid vegetable oil, for use in combination with ingredients of a yeast-raised baking product, comprising;

about 4 to about 10 weight parts of a soft or hard mono- and diglyceride derived from vegetable oil;

about 2 to about 8 weight parts of an ethoxylated fatty acid ester emulsifier selected from the group consisting of ethoxylated fatty acid esters of glycerol, polyglycerols, propylene glycol, hexitol, hexitan and isohexide, or a fatty acid ester of ethoxylated glycerol, hexitol, hexitan and isohexide;

about 2 to about 8 weight parts of a solid beta-phase crystalline food emulsifier component; and about 40 to about 100 weight parts of liquid vegetable oil, wherein said soft or hard mono- and diglyceride, said ethoxylated fatty acid ester emulsifier, and said solid beta-phase crystalline food emulsifier component are dispersed by heating to form a liquefied molten mixture followed by quick chilling to about 80° to about 90° F. to form beta-fat crystals and a stabilized substantially uniform dispersion within said liquid vegetable oil.

6. The shortening of claim 5 wherein said solid beta-phase crystalline food emulsifier component is selected from the group consisting of an alkali or alkaline earth metal salt of an acyl lactylate and a succinylated mono- and diglyceride.

7. The shortening of claim 5 wherein said soft or hard mono- and diglyceride has an iodine value of about 0 to about 150.

8. The shortening of claim 5 wherein said ethoxylated fatty acid ester emulsifier is selected from the group consisting of ethoxylated monoglyceride, ethoxylated sorbitan, ethoxylated mannitan, ethoxyated monooleate, ethoxylated propylene glycol monoesters, and ethoxylated triglycerol monostearate.

9. The shortening of claim 5 wherein the weight ratio of soft or hard mono- and diglycerides to ethoxylated fatty acid ester emulsifier ranges between the ratios of 55/45 to about 40/60.

10. The shortening of claim 5 wherein the same contains less than about 5% entrapped gas by volume.

11. The shortening of claim 5 containing about 0 to about 3% soybean stearine.

* * * * *